United States Patent
Cox

[19]

[11] Patent Number: 6,069,914
[45] Date of Patent: May 30, 2000

[54] WATERMARKING OF IMAGE DATA USING MPEG/JPEG COEFFICIENTS

[75] Inventor: Ingemar J. Cox, Lawrenceville, N.J.

[73] Assignee: NEC Research Institute, Inc., Princeton, N.J.

[21] Appl. No.: 08/715,953

[22] Filed: Sep. 19, 1996

[51] Int. Cl.$^7$ ...................................................... H04B 1/69
[52] U.S. Cl. ........................... 375/150; 375/130; 375/243; 380/5
[58] Field of Search .................................. 380/5; 375/130, 375/140, 141, 142, 147, 150, 243, 254

[56] References Cited

U.S. PATENT DOCUMENTS

| | | | |
|---|---|---|---|
| 4,939,515 | 7/1990 | Adelson | 341/51 |
| 5,319,735 | 6/1994 | Preuss et al. | 704/205 |
| 5,530,751 | 6/1996 | Morris | 380/4 |
| 5,530,759 | 6/1996 | Braudaway et al. | 380/54 |
| 5,568,570 | 10/1996 | Rabbani | 382/238 |
| 5,636,292 | 6/1997 | Rhoads | 382/232 |
| 5,646,997 | 7/1997 | Barton | 380/23 |
| 5,659,726 | 8/1997 | Sandford, II et al. | 707/101 |
| 5,809,139 | 9/1998 | Girod et al. | 380/5 |
| 5,848,155 | 12/1998 | Cox | 380/4 |
| 5,930,369 | 7/1999 | Cox et al. | 380/54 |

FOREIGN PATENT DOCUMENTS

| | | | |
|---|---|---|---|
| 0690595 | 1/1995 | European Pat. Off. | H04L 9/18 |
| 2196167 | 4/1988 | United Kingdom | G11B 20/08 |
| 8908915 | 9/1989 | WIPO | G11B 20/10 |
| 9520291 | 7/1995 | WIPO | H04N 1/32 |
| 9621290 | 7/1996 | WIPO | H04H 1/00 |
| 9625005 | 8/1996 | WIPO | H04H 7/08 |
| 9627259 | 9/1996 | WIPO | H04N 1/32 |

OTHER PUBLICATIONS

R.G. Van Schyndel et al, "A digital watermark," in Intl. Conf. On Image Processing, vol. 2, pp. 86–90, 1994.

G. Caronni, "Assuring Ownership Rights for Digital Images," in Proc. Reliable IT Systems, VIS '95, 1995.

J. Brassil et al, "Electronic Marking and Identification Techniques to Discourage Document Copying," in Proc. Infocom '94, pp. 1278–1287, 1994.

K. Tanaka et al, "Embedding Secret Information into a Dithered Multi–level Image," in IEEE Military Comm. Conf., pp. 216–220, 1990.

K. Mitsui et al, "Video–Steganography: How to Secretly Embed a Signature in a Picture," in IMA Intellectual Property Project Proc., vol. 1, pp. 187–206, 1994.

Macq and Quisquater, "Cryptology for Digital TV Broadcasting," in Proc. of the IEEE, vol. 83, No. 6, pp. 944–957, 1995.

W. Bender et al, "Techniques for data hiding," in Proc. of SPIE, vol. 2420, No. 40, Jul. 1995.

Koch, Rindfrey and Zhao, "Copyright Protection for Multimedia Data," in Proc. of the Int'l Conf. on Digital Media and Electronic Publishing (Leeds, UK, Dec. 6–8, 1994).

Koch and Zhao, "Towards Robust and Hidden Image Copyright Labeling," in Proc. of 1995 IEEE Workshop on Nonlinear Signal and Image Processing (Neos Marmaras, Halkidiki, Greece, Jun. 20–22, 1995.

Zhao and Koch, "Embedding Robust Labels Into Images For Copyright Protection," in Proc. Int. Congr. on IPR for Specialized Information, Knowledge and New Technologies (Vienna, Austria), Aug. 21–25, 1995.

"Digital Copyright: Who Owns What?" NewMedia, Sep. 1995, pp. 38–43.

(List continued on next page.)

*Primary Examiner*—Young T. Tse
*Attorney, Agent, or Firm*—Philip J. Feig; Jeffery J. Brosemer

[57] ABSTRACT

A watermark is embedded into video/image/multimedia data using spread spectrum methodology. The watermark is extracted from watermarked data without the use of an original or unwatermarked version of the data by using MPEG/JPEG coefficients. The image to be watermarked is divided into subimages. Each subimage is embedded with a watermark. When extracting the watermark, the result from each subimage is combined to determine the originally embedded watermark.

18 Claims, 2 Drawing Sheets

OTHER PUBLICATIONS

"Publish and Be Robbed?" New Scientist, Feb. 18, 1995, pp. 32–37.

Kohno et al, "Spread Spectrum Access Methods for Wireless Communications," in IEEE Communications Magazine, Jan. 1995, pp. 58–67, I16.

Campana and Quinn, "Spread spectrum communications," in IEEE Potentials, Apr. 1993, pp. 13–16.

Mowbray and Grant, "Wideband coding for uncoordinated multiple access communication," in Electronics & Communication Engineering Journal, Dec. 1992, pp. 351–361.

Digimarc Overview & "Wired" Magazine article (Jul. 1995 issue)—Jun. 1995.

A.G. Bors et al., "Image Watermarking Using DCT Domain Constraints", Dept. Of Informatics, University of Thessaloniki.

I.J. Cox et al., "Secure Spread Spectrum Watermarking for Multimedia", NEC Research Institute, Technical Report 95–10.

H.S. Stone, "Analysis of Attacks on Image Watermarks with Randomized Coefficients", NEC Research Institute, May 17, 1996.

F.M. Boland et al., "Watermarking Digital Images for Copyright Protection", Image Processing and its Applications, Jul. 4–6, 1995, Conference Publication No. 410, pps 326–330.

L. Boney et al., "Digital Watermarks for Audio Signals".

Swanson et al., "Transparent Robust Image Watermarking", Proc. IEEE Int. Conf. On Image Proc. 1996.

J.J.K. O Ruanaidh et al., "Phase Watermarking of Digital Images".

I. Pitas, "A Method for Signature Casting on Digital Images".

C.T. Hsu et al., "Hidden Signatures in Images", ICIP 96 Conf. Proc., Sep. 16–19, 1996.

M. Schneider et al., "A Robust Content Based Digital Signature for Image Authentication", ICIP 96 Conf. Proc., Sep. 16–19, 1996.

S. Roche et al., "Multi–Resolution Access Control Algorithm Based on Fractal Coding", ICIP 96 Conf. Proc., Sep. 16–19, 1996.

K. Hirotsugu, "An Image Digital Signature System with ZKIP for the Graph Isomorphism", ICIP 96 Conf. Proc., Sep. 16–19, 1996.

R.B. Wolfgang et al., "A Watermark for Digital Images".

J.J.K. O Ruanaidh et al., "Watermarking Digital Images for Copyright Protection", EVA 96 Florence, pp. 1–7.

T. Aura, "Invisible Communication", Nov. 6, 1995.

D. Kahn, "Information Hiding—An Annotated Bibliography", Macmillan 1967, Library of Congress catalog No. 63–16109.

Craver et al., "Can Invisible Watermarks Resolve Rightful Ownerships?", IBM Research Report.

Podilchuk et al., "Digital Image Watermarking Using Visual Models", Proc. of EI'97, vol. 3016, Feb. 9–14, 1997.

Cox et al., "A review of watermarking and the importance of perceptual modeling", Proc. of EI'97, vol. 3016, Feb. 9–14, 1997.

Watson, "DCT quantization matrices visually optimized for individual images", SPIE, vol. 1913, pp. 202–216.

Ahumada, Jr. et al., "Luminance–Model–Based DCT Quantization for Color Image Compression", SPIE, vol. 1666 (1992), pp. 365–374.

Hartung et al., "Digital Watermarking of Raw and Compressed Video", Systems for Video Communication, Oct. 1996, pp. 205–213.

WATERMARKING OF IMAGE DATA USING MPEG/JPEG COEFFICIENTS

FIELD OF THE INVENTION

The present invention relates to digital watermarking of data including video, image and multimedia data. Specifically, the invention relates to the extraction of a watermark of embedded data from watermarked data without using an original or unwatermarked version of the data using MPEG/JPEG coefficients. More specifically, the image is divided into subimages, each of which has a watermark embedded therein.

BACKGROUND OF THE INVENTION

The proliferation of digitized media such as image, video and multimedia is creating a need for a security system which facilitates the identification of the source of the material.

Context providers, i.e. owners of works in digital data form, have a need to embed signals into video/image/multimedia data which can subsequently be recorded or detected by software and/or hardware devices for purposes of authenticating copyright ownership, control and management.

For example, a coded signal might be inserted in data to indicate that the data should not be copied. The embedded signal should preserve the image fidelity, be robust to common signal transformations and resistant to tampering. In addition, consideration must be given to the data rate that can be provided by the system, though current requirements are relatively low—a few bits per frame.

In U.S. patent application Ser. No. 08/534,894, filed Sep. 28, 1995which was subsequently file wrapper continuation application Ser. No. 08/926,720now, U.S. Pat. No. 5,930,369, entitled "Secure Spread Spectrum Watermarking for Multimedia Data" and assigned to the same assignee as the present invention, which is incorporated herein by reference, there was proposed a spread spectrum watermarking method which embedded a watermark signal into perceptually significant regions of an image for the purposes of identifying the content owner and/or possessor. A strength of this approach is that the watermark is very difficult to remove. In fact, this method only allows the watermark to be read if the original image or data is available for comparison. This is because the original spectrum of the watermark is shaped to that of the image through a non-linear multiplicative procedure and this spectral shaping must be removed prior to detection by matched filtering and the watermark is inserted into the N largest spectral coefficients, the ranking of which is not preserved after watermarking. Thus, this method does not allow software and hardware devices to directly read embedded signals.

In an article by Cox et al., entitled "Secured Spectrum Watermarking for Multimedia" available at http://www.neci.nj.com/tr/index.html (Technical Report No. 95-10) spread spectrum watermarking is described which embeds a pseudo-random noise sequence into the digital data for watermarking purposes.

The above prior art watermark extraction methodology requires the original image spectrum be subtracted from the watermark image spectrum. This restricts the use of the method when there is no original image or original image spectrum available. One application where this presents a significant difficulty is for third party device providers desiring to read embedded information for operation or denying operation of such a device.

In U.S. Pat. No. 5,319,735 by R. D. Preuss et al entitled "Embedded Signalling" digital information is encoded to produce a sequence of code symbols. The sequence of code symbols is embedded in an audio signal by generating a corresponding sequence of spread spectrum code signals representing the sequence of code symbols. The frequency components of the code signal being essentially confined to a preselected signalling band lying within the bandwidth of the audio signal and successive segments of the code signal corresponds to successive code symbols in the sequence. The audio signal is continuously frequency analyzed over a frequency band encompassing the signalling band and the code signal is dynamically filtered as a function of the analysis to provide a modified code signal with frequency component levels which are, at each time instant, essentially a preselected proportion of the levels of the audio signal frequency components in corresponding frequency ranges. The modified code signal and the audio signal are combined to provide a composite audio signal in which the digital information is embedded. This component audio signal is then recorded on a recording medium or is otherwise subjected to a transmission channel.

In U.S. patent application Ser. No. 08/708,331, filed Sep. 4, 1996now U.S. Pat. No. 5,848,155, entitled "Spread Spectrum Watermark for Embedded Signalling" by Cox there is described a method for extracting a watermark of embedded data from watermarked data without using an original or unwatermarked version of the data.

This method of watermarking an image or image data for embedding signaling requires that the DCT (discrete cosine transform) and its inverse of the entire image be computed. There are fast algorithms for computing the DCT in N log N time, where N is the number of pixels in the image. However, for N=512×512, the computational requirement is still high, particularly if the encoding and extracting processes must occur at video rates, i.e. 30 frames per second. This method requires approximately 30 times the computation needed for MPEG-II decompression.

While one possible way to achieve real-time video watermarking is to only watermark every $30^{th}$ frame. Content owners wish to protect each and every video frame. Moreover, if it is known which frames contain embedded signals, it is simple to remove those frames with no noticeable degradation in the video signal.

An alternative option is to insert the watermark into n×n blocks of the image (subimages) where n<<N. Then the computation cost in $$\frac{N}{n} n \log n = N \log n.$$

For $N=512\times512=2^{18}$ and $n=8\times8=2^6$, the asymptotic saving is only a factor of 3. However, empirically the cost of computing the DCT over the entire image may be significantly higher when cache, loop unfolding and other efficiency issues are considered. Thus, the practical difference may approach a 30 fold savings.

The present invention advances this work by using MPEG/JPEG coefficients to encode the image data.

SUMMARY OF THE INVENTION

The present invention overcomes the limitations of the prior systems by computing the DCT on 8×8 block subimages of the image. The insertion process is repeated for each 8×8 subimage.

The invention will be best understood when the following description is read in conjunction with the accompanying drawing.

DETAILED DESCRIPTION

Figure 1:
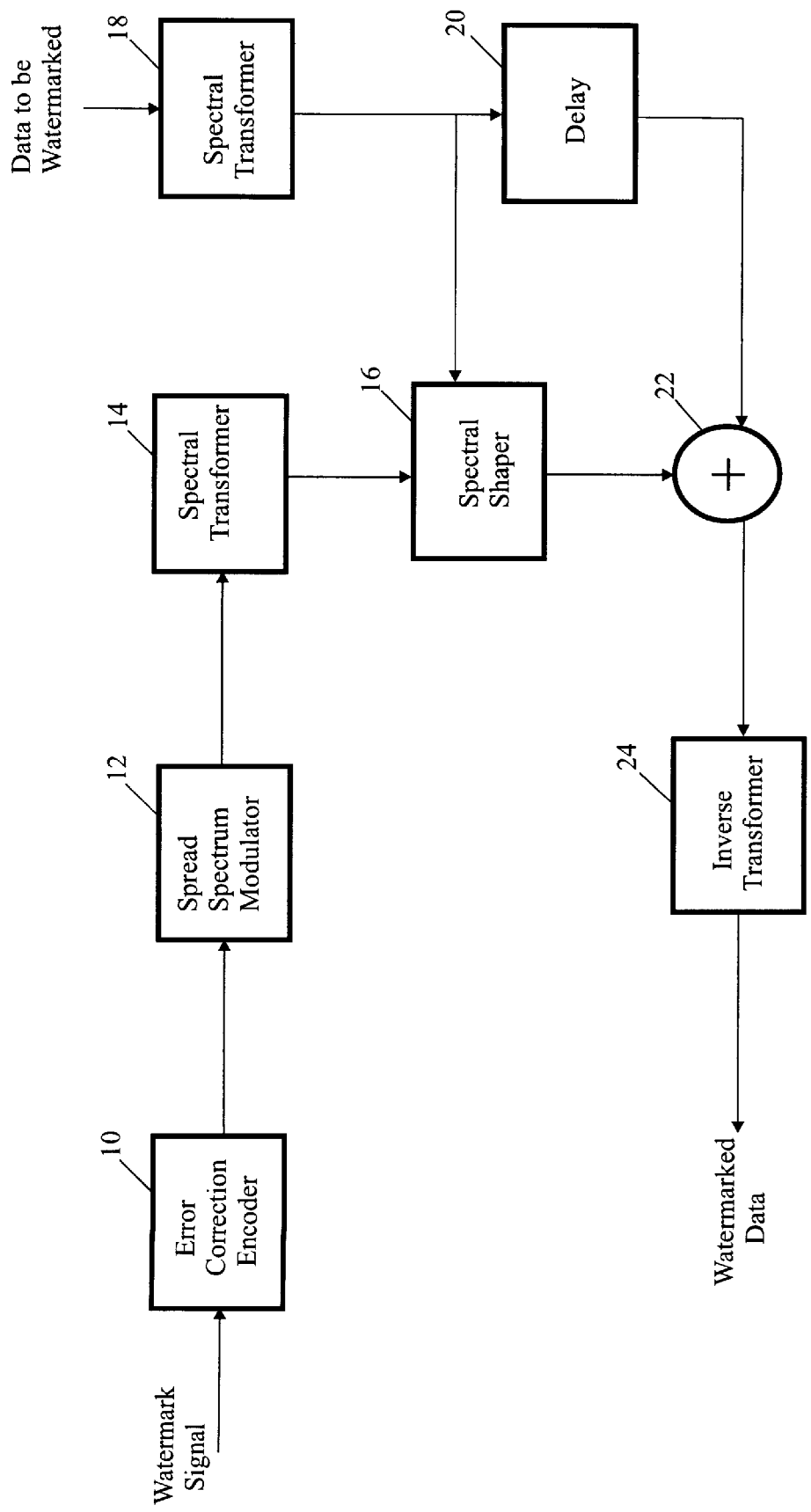
FIG. 1 is a schematic block diagram of a spread spectrum system for use in watermark insertion.

Referring now to the figures and to FIG. 1 in particular, there is shown a schematic block diagram of a method for inserting a watermark into a digital data, for instance an image. In the following description reference may be made to image data or images. While the invention has applicability to image data and images, it will be understood that the teachings herein and the invention itself are equally applicable to video, image and multimedia data and the term image and image data will be understood to include these terms where applicable. As used here in watermark will be understood to include embedded data, symbols, images, instructions or any other identifying information.

In FIG. 1 a watermark signal is provided as an input to an error correction encoder 10. The output of encoder 10 is provided to a spread spectrum modulator 12. The output of modulator 12 is provided to a spectral transformer 14. The output of spectral transformer 14 is provided as one input to a spectral shaper 16. A signal to be watermarked is provided to a spectral transformer 18. The output of the transformer 18 is provided as a second input to spectral shaper 16 and to a delay 20. The output of the spectral shaper 16 is added to the output of delay 20 at a summer 22. The summer output is subject to an inverse transformer 24. The result of the inverse transformer is a watermarked data.

In order to capitalize on the improved computational efficiency of computing the DCT on a 8×8 block, the image is divided into subimages of 8×8 pixel blocks. The watermark insertion method is applied to each 8×8 subimage. That is, for each 8×8 subimage, a pseudorandom number (PN) sequence is inserted into the DCT coefficient of the suitable spectral shaping. The procedure is repeated for all such subimages. The size of the subimage is preferably 8×8, but it can be of other sizes, such as 2×2, 3×3 or 4×4.

Figure 2:
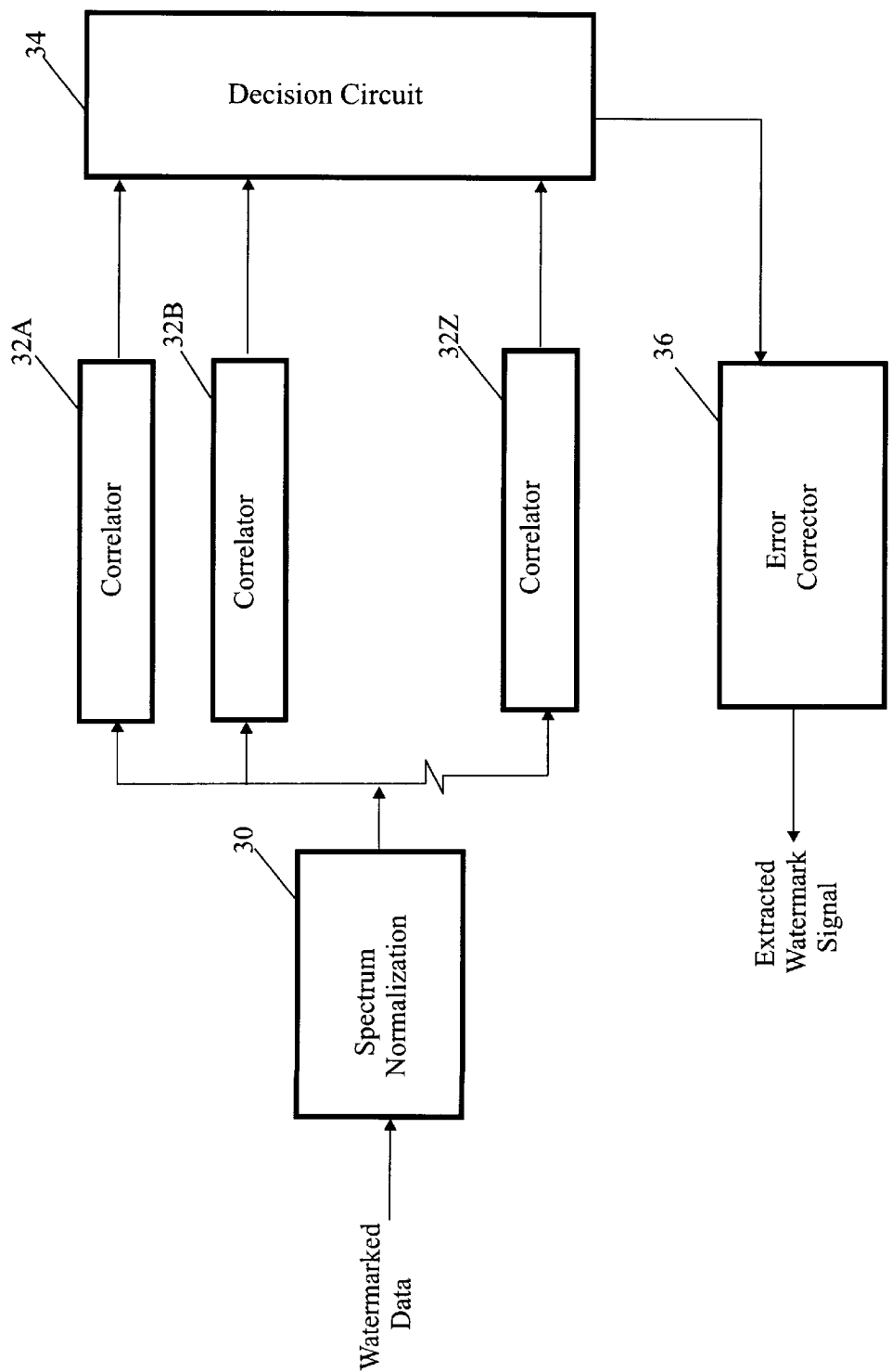
FIG. 2 schematic block diagram of a spread spectrum receiver.

Receiving or extracting a spread spectrum signal is shown in FIG. 2. The watermarked image, video or multimedia data is first spectrally normalized 30 to undo any previously performed spectral shaping. The normalized signal is then analyzed by a bank of correlators 32A . . . 32Z, each correlator detecting the presence, if any, of a particular PN sequence (one for each symbol in the alphabet). The decision circuit 34 sums the output from each subimage then typically selects the PN sequence with the maximum output as the most likely current symbol. More sophisticated decision procedures are possible.

Summing the outputs from each of the subimage correlators assumes that the same PN sequence is embedded in all subimages, i.e. only a single PN sequence is embedded.

Alternatively, two (or more) different PN sequences might be embedded, though only one in any particular subimage. The two PN sequences may denote the binary bits 0 and 1, thereby facilitating the embedding of a bit string. The detection error rate will be higher than in the previous embodiment but can be reduced by use of an error correction code such as Reed-Solomon.

A combination of the two approaches is also possible, each bit being replicated over a small number of subimages whose correlators are then summed together to reduce the detection error rate and these bits then being processed by an error correction circuit to further reduce errors.

The sequence of most likely current symbols is then provided as an input to an error correction stage 36 which corrects for false decisions made by the decision circuit. The output of the error correction stage is an extracted watermark signal. In order to perform the spectral normalization 30, the previously performed spectral shaping procedure is inverted. In the present case, the original unwatermarked signal is no longer available. Thus, the average power of the frequency coefficients, $\text{avg}(|f_i|)$, as approximated by the average of the watermarked signal, i.e. $\text{avg}(|f_i'|)$ $$\text{avg}(|f_i|) \approx \text{avg}(|f_i'|) \tag{1}$$

This is approximately true since $\alpha \text{avg}(f_i)W_i \ll f_i$, where Wi is the watermark component, and $\alpha$ is a constant typically in the range between 0.1 and 0.01.

The normalization stage then divides each coefficient ($f_i'$) in the received signal by the local average avg ($f_i'$) in the neighborhood.

That is, $$\frac{f_i'}{\text{avg}(f_i')} = \frac{f_i + \alpha \text{avg}(f_i)W_i}{\text{avg}(f_i')} \tag{2}$$

$$\approx \frac{f_i}{\text{avg}(f_i')} + \alpha W_i$$

The first term, on the right hand side (RHS) of Equation (2), $$\frac{f_i}{\text{avg}(f_i')},$$

is considered a noise term. It was not present in the prior system, patent application Ser. No. 08/534,894, because access to the unwatermarked coefficients allowed this term to be removed. The second term $\alpha W_i$ is the original watermark signal which can now be detected using conventional correlation.

If the watermark is extracted from any single 8×8 block, the detector reliability is very low. If, however, the detector responses are added together from all 8×8 blocks, then a very strong and unambiguous response is obtained.

In using the present method preferably there is a unique PN sequence for each symbol in the alphabet. The method is relatively robust to clipping since the detector output reduces linearly with the quantity of 8×8 subimage blocks in the image. For DVD (digital video disk) embedded signaling for APS (analog protection system) and CGMS (copy generation management system), there would be a total of 8 or 16 PN sequences.

In the prior systems, the object was to embed a single PN (pseudo random number) sequence into an image. The information associated with the PN sequence was assumed to be stored in a database together with the original image and the spectral location of the embedded watermark. The locations of the watermarked components had to be recorded because the implementation approximated the N perceptually most significant regions of the watermark by the N largest coefficients. However, this ranking was not invariant to the watermarking process. The N largest coefficients may be different after inserting the watermark than before inserting the watermark.

In order to avoid this problem, the current method places a watermark in predetermined locations of the spectrum, typically the first N coefficients. However, any predetermined locations could be used, though such locations should belong to the perceptually significant regions of the spectrum if the watermark is to survive common signals transformations such as compression, scaling, etc.

More generally, the information to be embedded is a sequence of m symbols drawn from an alphabet A (e.g. the binary digits or the ASCII symbols). This data is then supplemented with additional symbols for error detection and correction. Each symbol is then spread spectrum modulated, a process that maps each symbol into a unique PN sequence known as a chip. The number of bits per chip is preset—the longer the chip length, the higher the detected signal-to-noise ratio will be, but this is at the expense of signaling bandwidth.

The power spectrum of the PN sequence is white, i.e. flat, and is therefore shaped to match that of the "noise", i.e. the image/video/audio/or multimedia data into which the watermark is to be embedded. It is this spectral shaping that must be modified from the prior methods so that the extraction process no longer requires the original image. To do this, each coefficient of the watermarked spectrum is scaled by the local average of the image spectral coefficient rather than the coefficient itself, i.e.

$$f_i' = f_i + \alpha \operatorname{avg}(f_i) W i \tag{4}$$

This average may be obtained in several ways. It may be a local average over a two dimensional region. Alternatively, the two dimensional spectrum may be sampled to form a one dimensional vector and a one dimensional local average may be performed. One dimensional vectorization of the 2D 8×8 DCT coefficients is already performed as part of MPEG II. The average may be a simple box or weighted average over the neighborhood.

For video data, temporal averaging of the spectral coefficients over several frames can also be applied. However, since several frames are needed for averaging at the spectral normalization stage of the extractor, the protection of individual video frames taken in isolation may not be possible. For this reason, the present invention treats video as a very large collection of still images. In this way, even individual video frames are copy protected.

There is one primary change to the Cox procedure that is necessary, that is, to reduce the length of the PN sequence to less than 64 bits. In experiments, a PN sequence length of 25 is used. The value 25 is not deemed to be critical. The upper limit of 64 is imposed by the current state of the art processors and could be increased in the future. Also, in tests, it is now found that when the size of the average filter was changed from 7 to 3, there was an improvement in performance. The averaging is the averaging of the absolute coefficient values and not the coefficient values themselves. This is effectively estimating the average power present in each frequency. Other averaging procedures are possible, for example, averaging over several frames or average of local neighborhoods of 8×8 blocks.

The number of 8×8 blocks in a 512×512 image is 4096, suggesting that significantly more than one of 16 symbols can be embedded in an image or video frame. Assume, for example, that it is desired to embed 1 out of 128 symbols in an image. It is necessary to perform 128 parallel correlations for each 8×8 block. This is computationally tractable but hardware implementations of each correlation become more complex. An alternative is to only use two binary symbols. It may be preferable to associate more than one PN sequence with each of the two binary symbols or bits in order to increase the difficulty of intentionally removing the watermark. In this case, there are only two correlators and a binary string may be embedded into the image. The raw bit error rate will be very high due by the low detector output. However, this can be reduced to acceptable levels by using error correcting codes, such as Reed-Solomon (RS). RS codes are robust to burst error which may occur because of clipping of the image. Other error correcting codes may also be used.

When using this method, it is necessary for the receiver to know the start location of the encoded block. The start location may not be obvious, particularly when the image has been subjected to clipping. However, convention synchronizing methods can be used; such as preceding end block with a special or unique symbol or string of symbols.

In summary, the present invention provides a modification to existing digital watermarking methods in which the original data was required for watermark extraction thereby enabling watermarking extraction in the absence of an unwatermarked or original data. The present invention uses MPEG/JPEG coefficients. An image is divided into typically 8×8 block subimages and each subimage is processed and the results are combined to derive the extracted watermark. The result is extraction of the watermark with very high confidence.

While there has been described and illustrated a system for inserting a watermark into and extracting a watermark from watermarked data without using an unwatermarked version of the data, it will be apparent to those skilled in the art that variations and modifications are possible without deviating from the broad principles and teachings of the present invention which shall be limited solely by the scope of the claims appended hereto.

What is claimed is:

1. A method of extracting a watermark from watermarked data comprising the steps of:

receiving watermarked data from subregions of watermarked data;

spectrum normalizing the watermarked data from each subregion to generate normalized signals, where said spectrum normalizing comprises dividing each frequency coefficient in the watermarked data by a local average power of the frequency coefficients;

correlating the normalized signals with predetermined PN sequences corresponding to predetermined symbols to provide correlated signals for each predetermined PN sequence in each subregion;

deciding which correlated signal is most likely a current symbol in each subregion for providing an extracted symbol stream;

error correcting the extracted symbol stream; and extracting a sequence of most likely current symbols corresponding to the watermark.

2. A method of extracting a watermark from watermarked data as set forth in claim 4, where said subregions are MPEG/JPEG coefficients of the data to be watermarked.

3. A method of extracting a watermark from watermarked data comprising the steps of:

receiving watermarked data from subregions of watermarked data;

spectrum normalizing the watermarked data from each subregion to generate different normalized signals in predetermined subregions;

correlating the normalized signals with predetermined PN sequences corresponding to predetermined symbols to provide correlated signals for each predetermined PN sequence in each subregion;

deciding which correlated signal is most likely a current symbol in each subregion for providing an extracted symbol stream;

error correcting the extracted symbol stream; and extracting a sequence of most likely current symbols corresponding to the watermark.

4. A method of extracting a watermark from watermarked data as set forth in claim 6, where said subregions are MPEG/JPEG coefficients of the data to be watermarked.

5. A method of extracting a watermark from watermarked data as set forth in claim 6, where said spectrum normalizing comprises dividing each frequency coefficient in the watermarked data by a local average power of the frequency coefficients.

6. A method of extracting a watermark from watermarked data as set forth in claim 8, where said subregions are MPEG/JPEG coefficients of the data to be watermarked.

7. A method of extracting a watermark from watermarked data comprising the steps of:

receiving watermarked data from subregions of watermarked data;

spectrum normalizing the watermarked data from each subregion to generate normalized signals, where there are a plurality of normalized signals in each subregion and where said spectrum normalizing comprises dividing each frequency coefficient in the watermarked data by a local average power of the frequency coefficients;

correlating the normalized signals with predetermined PN sequences corresponding to predetermined symbols to provide correlated signals for each predetermined PN sequence in each subregion;

deciding which correlated signal is most likely a current symbol in each subregion for providing an extracted symbol stream;

error correcting the extracted symbol stream; and extracting a sequence of most likely current symbols corresponding to the watermark.

8. A method of extracting a watermark from watermarked data as set forth in claim 7, where said subregions are MPEG/JPEG coefficients of the data to be watermarked.

9. A method for inserting symbols into data to be watermarked comprising the steps of:

dividing data to be watermarked into a plurality of subregions;

spread spectrum modulating the symbols by mapping each symbol into a respective PN sequence;

spectral shaping each PN sequence; and embedding each spectral shaped PN sequence in predetermined coefficients in predetermined subregions of the data.

10. A method of inserting symbols into data to be watermarked as set forth in claim 9, where said subregions are MPEG/JPEG coefficients of the data to be watermarked.

11. A method of extracting a watermark from watermarked data comprising the steps of:

receiving watermarked data from subregions of watermarked data;

spectrum normalizing the watermarked data from each subregion to generate normalized signals, where said spectrum normalizing comprises dividing each frequency coefficient in the watermarked data by a local average power of the frequency coefficients;

correlating the normalized signals with predetermined PN sequences corresponding to predetermined symbols to provide correlated signals for each predetermined PN sequence in each subregion;

combining correlated signals from each subregion to generate correlated signals for the watermarked data;

deciding which correlated signal is most likely a current symbol; and extracting a sequence of most likely current symbols corresponding to the watermark.

12. A method of extracting a watermark from watermarked data as set forth in claim 18, where said subregions are MPEG/JPEG coefficients of the data to be watermarked.

13. A method of extracting a watermark from watermarked data comprising the steps of:

receiving watermarked data from subregions of watermarked data;

spectrum normalizing the watermarked data from each subregion to generate normalized signals, where different normalized signals are in predetermined subregions;

correlating the normalized signals with predetermined PN sequences corresponding to predetermined symbols to provide correlated signals for each predetermined PN sequence in each subregion, combining correlated signals from each subregion to generate correlated signals for the watermarked data;

deciding which correlated signal is most likely a current symbol; and extracting a sequence of most likely current symbols corresponding to the watermark.

14. A method of extracting a watermark from watermarked data as set forth in claim 13, where said subregions are MPEG/JPEG coefficients of the data to be watermarked.

15. A method of extracting a watermark from watermarked data as set forth in claim 13, where said spectrum normalizing comprises dividing each frequency coefficient in the watermarked data by a local average power of the frequency coefficients.

16. A method of extracting a watermark from watermarked data as set forth in claim 15, where said subregions are MPEG/JPEG coefficients of the data to be watermarked.

17. A method of extracting a watermark from watermarked data comprising the steps of:

receiving watermarked data from subregions of watermarked data;

spectrum normalizing the watermarked data from each subregion to generate normalized signals, where there are a plurality of normalized signals in each subregion and where said spectrum normalizing comprises dividing each frequency coefficient in the watermarked data by a local average power of the frequency coefficients;

correlating the normalized signals with predetermined PN sequences corresponding to predetermined symbols to provide correlated signals for each predetermined PN sequence in each subregion;

combining correlated signals from each subregion to generate correlated signals for the watermarked data;

deciding which correlated signal is most likely a current symbol; and extracting a sequence of most likely current symbols corresponding to the watermark.

18. A method of extracting a watermark from watermarked data as set forth in claim 17, where said subregions are MPEG/JPEG coefficients of the data to be watermarked.

* * * * *

UNITED STATES PATENT AND TRADEMARK OFFICE
CERTIFICATE OF CORRECTION

PATENT NO : 6,069,914
DATED : May 30, 2000
INVENTOR(S): Ingemar J. Cox

It is certified that error appears in the above-identified patent and that said Letters Patent are hereby corrected as shown below:

Column 6, line 57, cancel "4" and insert therefor -- 1 --.

Column 7, line 10, cancel "6" and insert therefor -- 3 --.

Column 7, line 13, cancel "6" and insert therefor -- 3 --.

Column 7, line 18, cancel "8" and insert therefor -- 5 --.

Column 8, line 11, cancel "18" and insert therefor -- 11 --.

Signed and Sealed this

Third Day of April, 2001

*Attest:*

NICHOLAS P. GODICI

*Attesting Officer*     *Acting Director of the United States Patent and Trademark Office*